(12) United States Patent
Shetty et al.

(10) Patent No.: US 8,370,836 B2
(45) Date of Patent: Feb. 5, 2013

(54) SYSTEM AND METHOD TO ENABLE POWER RELATED DECISIONS IN A VIRTUALIZATION ENVIRONMENT

(75) Inventors: Sudhir V. Shetty, Cedar Park, TX (US); George Richards, III, Round Rock, TX (US); Mukund P. Khatri, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 389 days.

(21) Appl. No.: 12/695,591

(22) Filed: Jan. 28, 2010

(65) Prior Publication Data
US 2011/0185356 A1     Jul. 28, 2011

(51) Int. Cl.
 *G06F 9/455*    (2006.01)
 *G06F 1/00*    (2006.01)
(52) U.S. Cl. .................................... 718/1; 713/300
(58) Field of Classification Search ............... 718/1, 104, 718/108; 713/320, 340
See application file for complete search history.

(56) References Cited

U.S. PATENT DOCUMENTS

| | | | |
|---|---|---|---|
| 6,075,938 A | 6/2000 | Bugnion et al. | |
| 6,105,119 A | 8/2000 | Kerr et al. | |
| 6,298,370 B1 | 10/2001 | Tang et al. | |
| 7,002,265 B2 * | 2/2006 | Potega | 307/149 |
| 7,090,782 B1 | 8/2006 | Kawaguchi et al. | |
| 7,143,368 B1 | 11/2006 | Plofsky et al. | |
| 7,155,550 B2 | 12/2006 | Katoh et al. | |
| 7,222,030 B2 | 5/2007 | Banginwar et al. | |
| 7,475,262 B2 * | 1/2009 | Banginwar et al. | 713/300 |
| 7,871,278 B1 * | 1/2011 | Herring et al. | 439/136 |
| 2002/0022966 A1 | 2/2002 | Horgan | |
| 2004/0024955 A1 | 2/2004 | Patel | |
| 2004/0267804 A1 | 12/2004 | Fresko et al. | |
| 2006/0184935 A1 | 8/2006 | Abels et al. | |
| 2006/0184936 A1 | 8/2006 | Abels et al. | |
| 2006/0184937 A1 | 8/2006 | Abels et al. | |
| 2006/0259621 A1 | 11/2006 | Ranganathan et al. | |
| 2007/0050650 A1 * | 3/2007 | Conroy et al. | 713/300 |
| 2007/0113222 A1 | 5/2007 | Dignum et al. | |
| 2008/0172398 A1 * | 7/2008 | Borkenhagen et al. | 707/100 |
| 2008/0222434 A1 * | 9/2008 | Shimizu et al. | 713/300 |
| 2008/0301475 A1 * | 12/2008 | Felter et al. | 713/300 |
| 2009/0019202 A1 | 1/2009 | Shetty et al. | |
| 2009/0150896 A1 * | 6/2009 | Tsushima et al. | 718/104 |
| 2009/0187776 A1 * | 7/2009 | Baba et al. | 713/320 |
| 2009/0254909 A1 * | 10/2009 | Hanson et al. | 718/102 |
| 2011/0004500 A1 * | 1/2011 | Nathuji | 705/7 |
| 2011/0072293 A1 * | 3/2011 | Mazzaferri et al. | 713/340 |

* cited by examiner

*Primary Examiner* — Thomas Lee
*Assistant Examiner* — Phil Nguyen
(74) *Attorney, Agent, or Firm* — Larson Newman, LLP

(57) ABSTRACT

A virtualization system includes an information handling system with a power detector that detects a power level of the information handling system and another power detector that detects another power level of the information handling system, a power status module, and a virtual machine manager that starts workloads on the information handling system. The power status module receives the power levels and sends the power levels to the virtual machine manager. The virtual machine manager apportions a first portion of the first power level to the first workload, apportions a second portion of the first power level to the second workload, apportions a first portion of the second power level to the first workload, and apportions a second portion of the second power level to the second workload.

20 Claims, 4 Drawing Sheets

SYSTEM AND METHOD TO ENABLE POWER RELATED DECISIONS IN A VIRTUALIZATION ENVIRONMENT

FIELD OF THE DISCLOSURE

This disclosure relates generally to information handling systems, and relates more particularly to enabling power related decisions in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data memory, or global communications. In addition, information handling systems can include a variety of hardware and software resources that can be configured to process, store, and communicate information and can include one or more computer systems, data memory systems, and networking systems. An information handling system can include virtual machines that run multiple operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
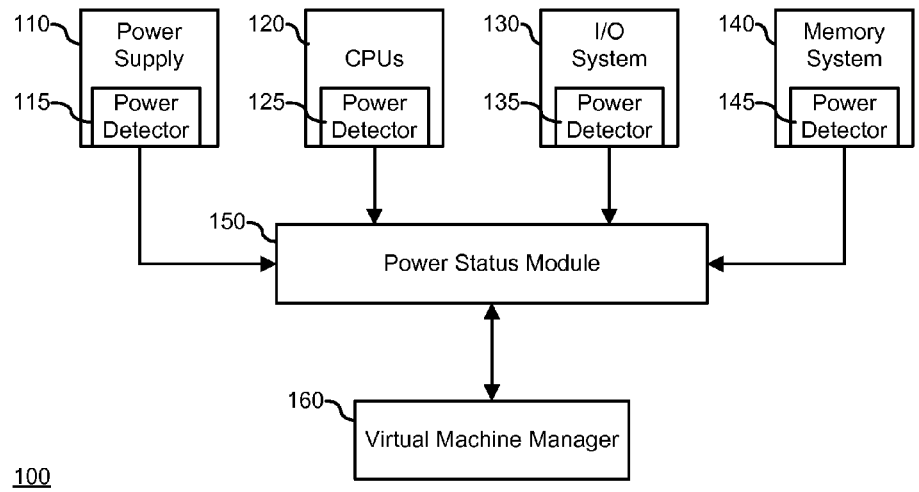
FIG. 1 is a block diagram of an embodiment of a virtualization environment.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

FIG. 1 illustrates a block diagram of an embodiment of a virtualization environment 100, including a power supply 110, one or more central processing units (CPUs) 120, an input/output (I/O) system 130, a memory system 140, a power status module 150 and a virtual machine manager 160. Power supply 110, CPUs 120, I/O system 130, and memory system 140 each include power detector modules 115, 125, 135, and 145, respectively. Power detector modules 115, 125, 135, and 145 are each connected to power status module 150, and power status module 150 is connected to virtual machine manager 160. Power detector modules 115, 125, 135, and 145, and power status module 150 can be implemented in hardware, software, firmware, or any combination thereof. Each module may include one or more information handling systems. When a module includes more than one information handling system, the functions of the module can be distributed across the multiple information handling systems in a symmetric manner, such that each information handling system performs the same type of tasks, or the multiple information handling systems can perform in an asymmetric manner, such that the multiple information handling systems of the module perform different tasks. In a particular embodiment, power status monitor 150 is implemented as an application programming interface.

Virtual machine manager 160 functions to create one or more workloads in virtual environment 100. Each workload includes a virtual operating system and application software to perform a particular dedicated task. For example, one workload can operate as a mail server, while another workload can operate as a file server. Virtual machine manager 160 thus provides for the separation of the hardware and the software used for each workload within a common physical system. In a particular embodiment, virtualization environment 100 is implemented on a single information handling system, and virtual machine manager 160 implements the workloads within that information handling system. In another embodiment (not illustrated), virtualization environment 100 includes two or more information handling systems grouped into a network. Here, each information handling system includes a power supply similar to power supply 110, one or more CPUs similar to CPU 120, an I/O system similar to I/O system 130, a memory system similar to memory system 140, and a power status module similar to power status module 150. A virtual machine manager similar to virtual machine manager 160 is connected to each power status module, and is implemented in one or more of the information handling systems to create the workloads across the information handling systems. For example, the virtual machine manager can be implemented on a single information handling system, the functionality of the virtual machine manager can be distributed on two or more information handling systems, or each information handling system can include a virtual machine manager that works in conjunction with the virtual machine managers in the other information handling systems.

In operation, power detector module 115 provides an indication to power status module 150 of the power being supplied by power supply 110. Power detector module 125 provides an indication to power status module 150 of the power being consumed by CPUs 120. Power detector module 135 provides an indication to power status module 150 of the power being consumed by I/O system 130. Power detector module 145 provides an indication to power status module 150 of the power being consumed by memory system 140. Power status module 150 provides information about the power being consumed by CPUs 120, I/O system 130, and memory system 140, based upon the information provided by power detectors 125, 135, and 145. In addition, power status module 150 provides information about the power being consumed by other elements of virtualization environment 100, based upon the information provided by power detectors 115, 125, 135, and 145.

For example, power status module 150 can take the total power consumed by virtualization environment 100 and subtract the sum of the power consumed by CPUs 120, I/O system 130, and memory system 140, as shown in Equation 1:

$$P_{Misc} = P_{PowerSupply} - (P_{CPU} + P_{I/O} + P_{Memory}) \quad \text{Equation 1}$$

where $P_{Misc}$ is the power consumed by miscellaneous elements of virtualization environment 110, $P_{PowerSupply}$ is the total power consumed by virtualization environment 100 as provided by power detector 115, $P_{CPU}$ is the power consumed by CPUs 120 as provided by power detector 125, $P_{I/O}$ is the power consumed by I/O system 130 as provided by power detector 135, and $P_{Memory}$ is the power consumed by memory system 140, as provided by power detector 145. In a particular embodiment (not illustrated) one or more of the miscellaneous elements of virtualization environment 100 include separate power detectors to give a more detailed indication of the power usage in virtualization environment 100. For example a memory system, a display system, another system, or a combination thereof can include a power detector, and power status module 150 can provide information on the power consumption as indicated by the power detector to virtual machine manager 160.

Virtual machine manager 160 receives the power status indications from power status module 150 and, using other information available to virtual machine manager 160, makes determinations related to the workloads in virtualization environment 100. Thus, virtual machine manager 160 includes information as to the number of workloads operating in virtualization environment 100, and information as to the amount of resources used by each workload operating in virtualization environment 100. By combining the power status information from power status module 150 with the information as to the number and resources of each workload, virtual machine manager 160 determines the power usage of each workload operating in virtualization environment 100.

Figure 2:
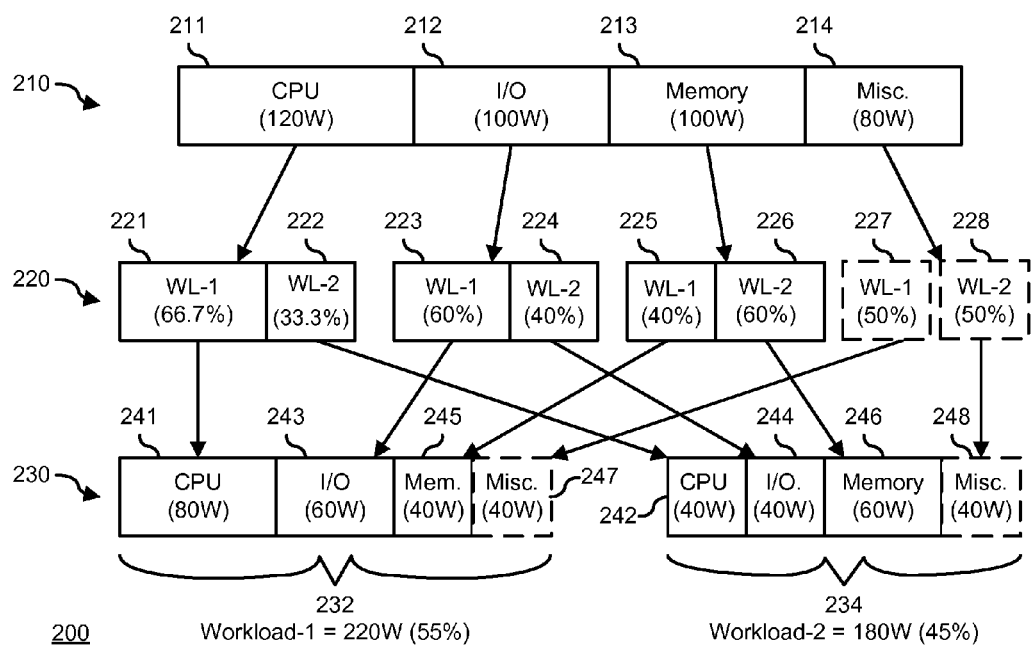
FIG. 2 is an illustration of the power usage in the virtualization environment of FIG. 1.

FIG. 2 illustrates the power usage 200 in virtualization environment 100 including power status information 210 from power status module 150, workload resource information 220 from virtual machine manager 160, and workload power usage 230 that is determined from power status information 210 and workload resource information 200. Power status information 210 includes total CPU power 211, total I/O power 212, total memory power 213, and total miscellaneous power 214. Total CPU power 211 is derived from power detector 125, and is illustrated as an exemplary value of 120 Watts (W). Total I/O power 212 is derived from power detector 135, and is illustrated as an exemplary value of 100 W. Total memory power 213 is derived from power detector 124, and is illustrated as an exemplary value of 100 W. Total miscellaneous power 214 is derived from power detectors 115, 125, 135, and 145 as described above, and is illustrated as an exemplary value of 80 W.

Workload resource information 220 includes first workload (WL-1) CPU resource information 221, second workload (WL-2) CPU resource information 222, WL-1 I/O resource information 223, WL-2 I/O resource information 224, WL-1 memory resource information 225, WL-2 memory resource information 226, WL-1 miscellaneous resource information 227, and WL-2 miscellaneous resource information 228. WL-1 and WL-2 CPU resource information 221 and 222 are illustrated with exemplary values of 66.7% of CPU resource load and 33.3% of CPU resource load, respectively. WL-1 and WL-2 I/O resource information 223 and 224 are illustrated with exemplary values of 60% of I/O resource load and 40% of I/O resource load, respectively. WL-1 and WL-2 memory resource information 225 and 226 are illustrated with exemplary values of 40% of memory resource load and 60% of memory resource load, respectively. WL-1 and WL-2 miscellaneous resource information 227 and 228 are each illustrated with exemplary values of 50% of the miscellaneous resource load and 33.3% of miscellaneous resource load, respectively. In a particular embodiment, virtual machine manager 160 includes information as to the resource load of each workload for the miscellaneous power consumed, and applies the resource load information accordingly to determine WL-1 and WL-2 miscellaneous resource information 227 and 228. In another embodiment, virtual machine manager 160 does not include explicit information as to the resource load of each workload for the miscellaneous power consumed, but divides the total miscellaneous power 214 by the number of workloads to derive WL-1 and WL-2 miscellaneous resource information 227 and 228.

Workload power usage 230 includes WL-1 power usage 232, and WL-2 power usage 234. WL-1 power usage 232 includes WL-1 CPU power usage 241, WL-1 I/O power usage 243, WL-1 memory power usage 245, and WL-1 miscellaneous power usage 247. WL-2 power usage 234 includes WL-2 CPU power usage 242, WL-2 I/O power usage 244, WL-2 memory power usage 246, and WL-2 miscellaneous power usage 248. Each of power usages 241 through 248 are derived by multiplying the associated total powers 211 through 214 with the associated workload resource information 221 through 228, as illustrated in Table 1. For example, WL-1 CPU power usage 241, shown in the column labeled "Workload-1" and the row labeled "CPU" as 80 W, is derived by multiplying total CPU power 211 with WL-1 CPU resource information 221 (120 W×66.7%=80 W). WL-1 power usage 232 is shown in the cell labeled "Total Power (Workload-1)" as 220 W, or 55% of total system power. Similarly, WL-2 power usage 234 is shown in the cell labeled "Total Power (Workload-2)" as 180 W, or 45% of total system power.

TABLE 1

Example Power Usage

| Workload - 1 | | |
|---|---|---|
| CPU | 120 W × 66.7% = | 80 W |
| I/O | 100 W × 60.0% = | 60 W |
| Storage | 100 W × 40.0% = | 40 W |
| Other | 80 W × 50.0% = | 40 W |
| Total Power (Workload - 1) | | 220 W (55%) |
| Workload - 2 | | |
| CPU | 120 W × 33.3% = | 40 W |
| I/O | 100 W × 40.0% = | 40 W |
| Storage | 100 W × 60.0% = | 60 W |
| Other | 80 W × 50.0% = | 40 W |
| Total Power (Workload - 2) | | 180 W (45%) |

The operator of virtualization environment 100 can use the information derived from power usage 200 to allocate processing costs to the particular task owners associated with WL-1 and WL-2. In a particular embodiment, virtualization environment 100 represents a server resource of an organization that provides processing services to various groups within the organization. For example, a manufacturing group can maintain an inventory management system as a workload on a company's servers, and a finance group can maintain an accounting system as a separate workload on the company's servers. The power usage information can be used to allocate the costs of maintaining and operating the company's servers. In another embodiment, virtualization environment 100 represents a server resource of an organization that provides processing services to various clients outside of the organization. For example, a web hosting service can maintain server resources and operate the hosted web sites as separate workloads, and the power usage information can be used to bill the owners of the hosted web sites based upon the amount of power used by each workload.

Virtual machine manager 160 also includes information as to a power allocation budget for CPUs 120, I/O system 130, memory system 140, and for the miscellaneous power loads in virtualization environment 100. By combining the power status indications from power status module 150 with the power allocation budgets, virtual machine manager 160 determines whether or not additional workloads can be created in virtualization environment 100 without violating any of the power allocation budgets.

Figure 3:
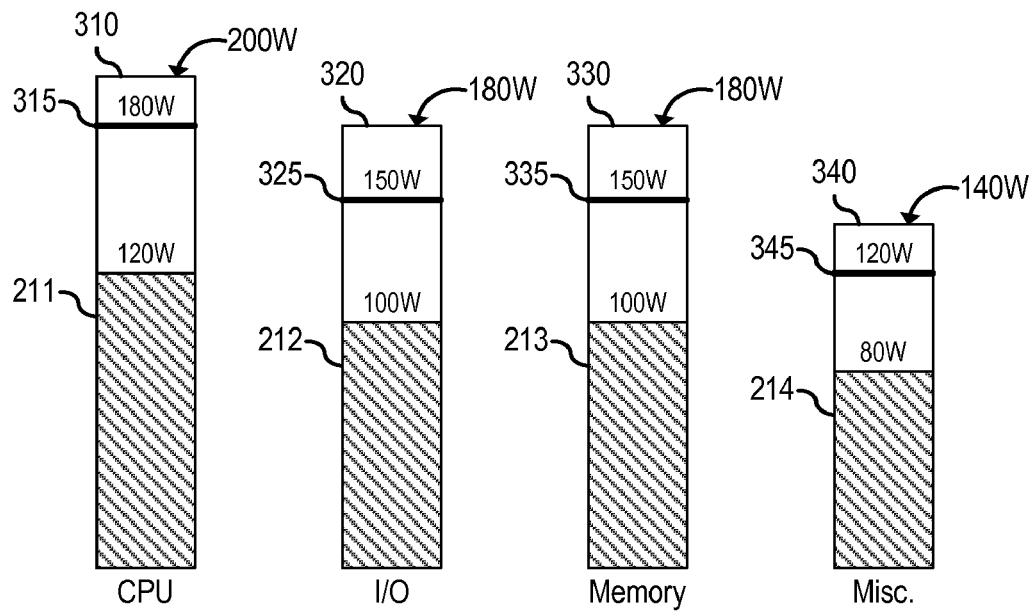
FIGS. 3-5 are illustrations of a power allocation budget in the virtualization environment of FIG. 1.

FIG. 3 illustrates a power allocation 300 in virtualization environment 100 including a CPU power allocation 310, an I/O power allocation 320, a memory power allocation 330, and a miscellaneous power allocation 340. CPU power allocation 310 represents a maximum peak power level for CPUs 120, and is illustrated as having an exemplary maximum value of 200 W. CPU power allocation 310 includes a CPU power budget 315 that is illustrated as an exemplary value of 180 W. I/O power allocation 320 represents a maximum peak power level for I/O system 130, and is illustrated as having an exemplary maximum value of 180 W. I/O power allocation 320 includes an I/O power budget 325 that is illustrated as an exemplary value of 150 W. Memory power allocation 330 represents a maximum peak power level for memory system 140, and is illustrated as having an exemplary maximum value of 180 W. Memory power allocation 330 includes a memory power budget 335 that is illustrated as an exemplary value of 150 W. Miscellaneous power allocation 340 represents a maximum peak power level for miscellaneous elements of virtualization environment 100, and is illustrated as having an exemplary maximum value of 140 W. Miscellaneous power allocation 340 includes a miscellaneous power budget 345 that is illustrated as an exemplary value of 120 W. The maximum peak power levels represented by power allocations 310, 320, 330, and 340, and power budgets 315, 325, 335, and 345 can be dictated by recommended ratings for the associated components in virtualization environment 100 in conjunction, by recommended ratings for power supply 110, by other power considerations in virtualization environment 100, or by a combination thereof. Power allocation 300 also illustrates the power status information. As such, CPU power allocation 310 includes total CPU power 211 illustrated as 120 W, I/O power allocation 320 includes total I/O power 212 illustrated as 100 W, memory power allocation 330 includes total memory power 213 illustrated as 100 W, and miscellaneous power allocation 340 includes total miscellaneous power 214 illustrated as 80 W.

Figure 4:
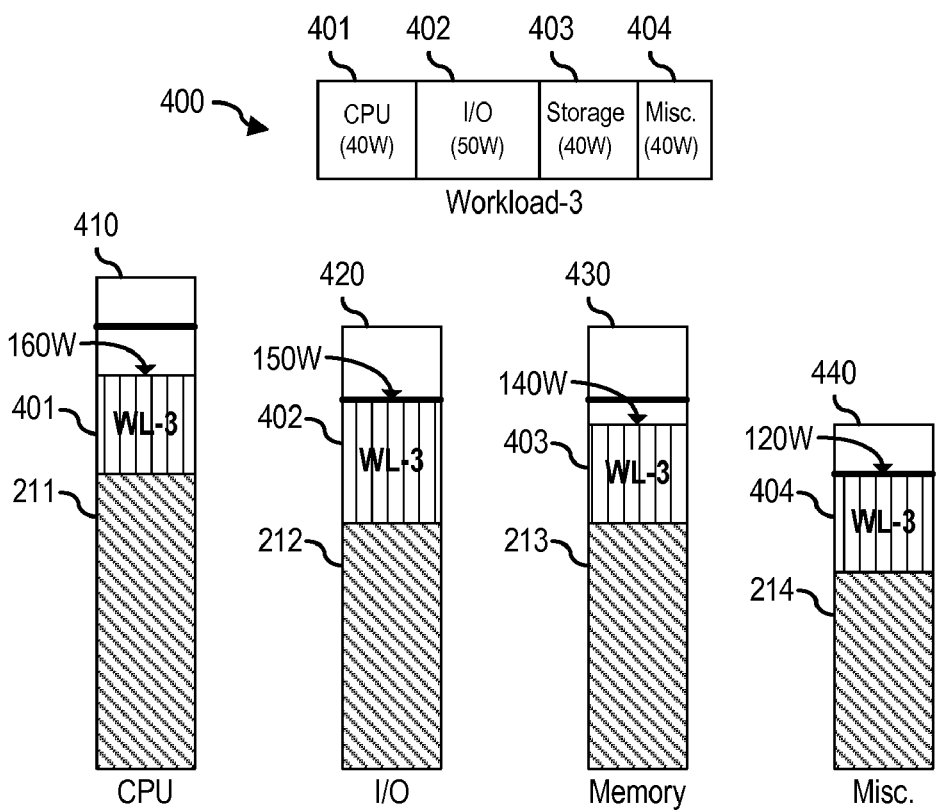

FIG. 4 illustrates a third workload (WL-3) power usage 400 and a WL-3 power allocation 405. WL-3 power usage 400 includes WL-3 CPU power usage 401 with an exemplary value of 40 W, WL-3 I/O power usage 402 with an exemplary value of 50 W, WL-3 memory power usage 403 with an exemplary value of 40 W, and WL-3 miscellaneous power usage 404 with an exemplary value of 40 W. WL-3 power allocation 405 includes a CPU power allocation 410, an I/O power allocation 420, a memory power allocation 430, and a miscellaneous power allocation 440. CPU power allocation 410 includes total CPU power 211 and WL-3 CPU power usage 401, illustrated as consuming a combined total of 160 W. Because the combined CPU power consumption is less than CPU power budget 315, the third workload can be created on virtualization environment 100 without exceeding CPU power budget 315. Similarly, I/O power allocation 320 includes total I/O power 212 and WL-3 I/O power usage 402, illustrated as consuming a combined total of 150 W, which is equal to I/O power budget 325. Thus the third workload can be created on virtualization environment 100 without exceeding I/O power budget 325. Further, memory power allocation 430 includes total memory power 213 and WL-3 memory power usage 403, illustrated as consuming a combined total of 140 W, which is less than memory power budget 335, and the third workload can be created on virtualization environment 100 without exceeding memory power budget 335. Moreover, miscellaneous power allocation 340 includes total miscellaneous power 214 and WL-3 miscellaneous power usage 404, illustrated as consuming a combined total of 120 W, which is equal to miscellaneous power budget 345, and the third workload can be created on virtualization environment 100 without exceeding miscellaneous power budget 345. Therefore, because the addition of the third workload in virtualization environment 100 does not cause the any of power allocations 410, 42, 430, or 440 to exceed their respective power budgets 315, 325, 335, or 345, then the third workload can be created on virtualization environment 100.

Figure 5:
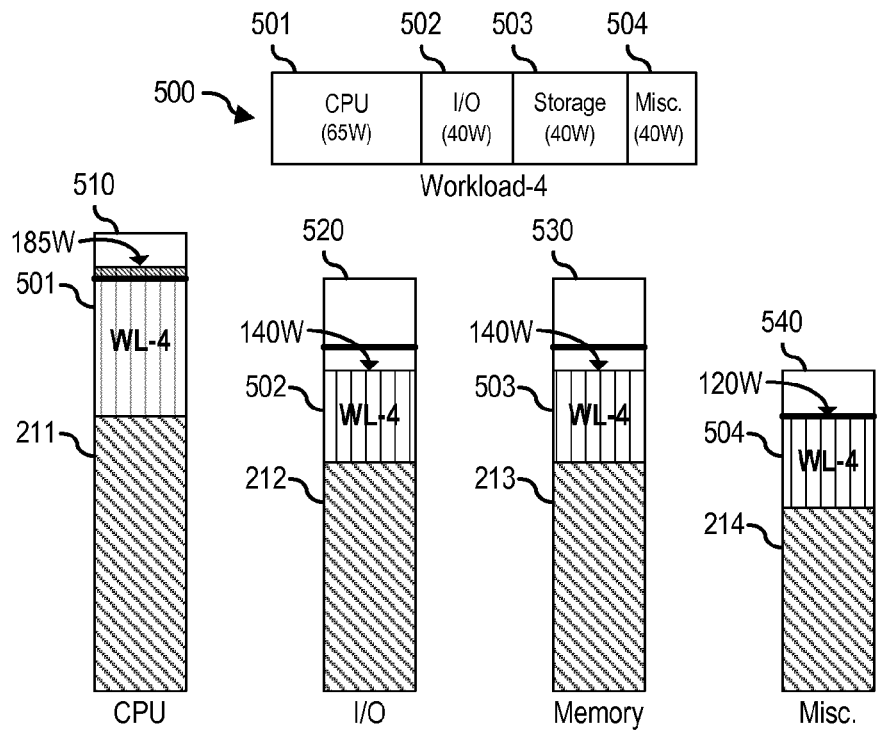

FIG. 5 illustrates a fourth workload (WL-4) power usage 500 and a WL-4 power allocation 505. WL-4 power usage 500 includes WL-4 CPU power usage 501 with an exemplary value of 65 W, WL-4 I/O power usage 502 with an exemplary value of 40 W, WL-4 memory power usage 503 with an exemplary value of 40 W, and WL-4 miscellaneous power usage 504 with an exemplary value of 40 W. WL-4 power allocation 505 includes a CPU power allocation 510, an I/O power allocation 520, a memory power allocation 530, and a miscellaneous power allocation 540. CPU power allocation 510 includes total CPU power 211 and WL-4 CPU power usage 501, illustrated as consuming a combined total of 185 W. I/O power allocation 520 includes total I/O power 212 and WL-4 I/O power usage 502, illustrated as consuming a combined total of 140 W. Memory power allocation 530 includes total memory power 213 and WL-4 memory power usage 503, illustrated as consuming a combined total of 140 W. Miscellaneous power allocation 540 includes total miscellaneous power 214 and WL-4 miscellaneous power usage 504, illustrated as consuming a combined total of 120 W. Here the combined I/O power consumption is less than I/O power budget 325, the combined memory power consumption is less than memory power budget 335, and the combined miscellaneous power consumption is equal to miscellaneous power budget 345. However, since the combined CPU power consumption is greater than CPU power budget 315, the fourth workload cannot be created on virtualization environment 100 without exceeding CPU power budget 315. Therefore, the addition of the fourth workload in virtualization environment 100 would cause a power overload on CPU power allocation 410 of 5 W, and the third workload cannot be created on virtualization environment 100.

In a particular embodiment, WL-3 CPU power usage 401, WL-3 I/O power usage 402, WL-3 memory power usage 403, WL-3 miscellaneous power usage 404, WL-4 CPU power usage 501, WL-4 I/O power usage 502, WL-4 memory power usage 503, and WL-4 miscellaneous power usage 504 are derived from workload resource information (not illustrated) similar to workload resource information 220. Thus, virtual machine manager 160 includes information as to the additional resource load that WL-3 and WL-4 will add in terms of allocation of CPUs 120, I/O system 130, memory system 140, and miscellaneous resources. For example, virtual machine manager 160 can include information that indicates that WL-1 uses twice the processing power of either WL-2 or WL-3. Then, knowing that WL-1 and WL-2 are currently operating in virtualization environment 100, virtual machine manager 160 can determine if the addition of WL-3, representing a 33.3% increase in processing power, will exceed CPU power budget 315. Similar determinations can be made with respect to WL-4, and to the allocation of resources to I/O system 130, memory system 140, and the miscellaneous resources. Note that, in a particular embodiment, virtual machine manager 160 estimates the additional resource load that WL-3 and WL-4 will add based upon extrapolations from virtual machine meta-data or historical data related to the additional resource loads for WL-3 and WL-4, or from similar workloads.

Figure 6:
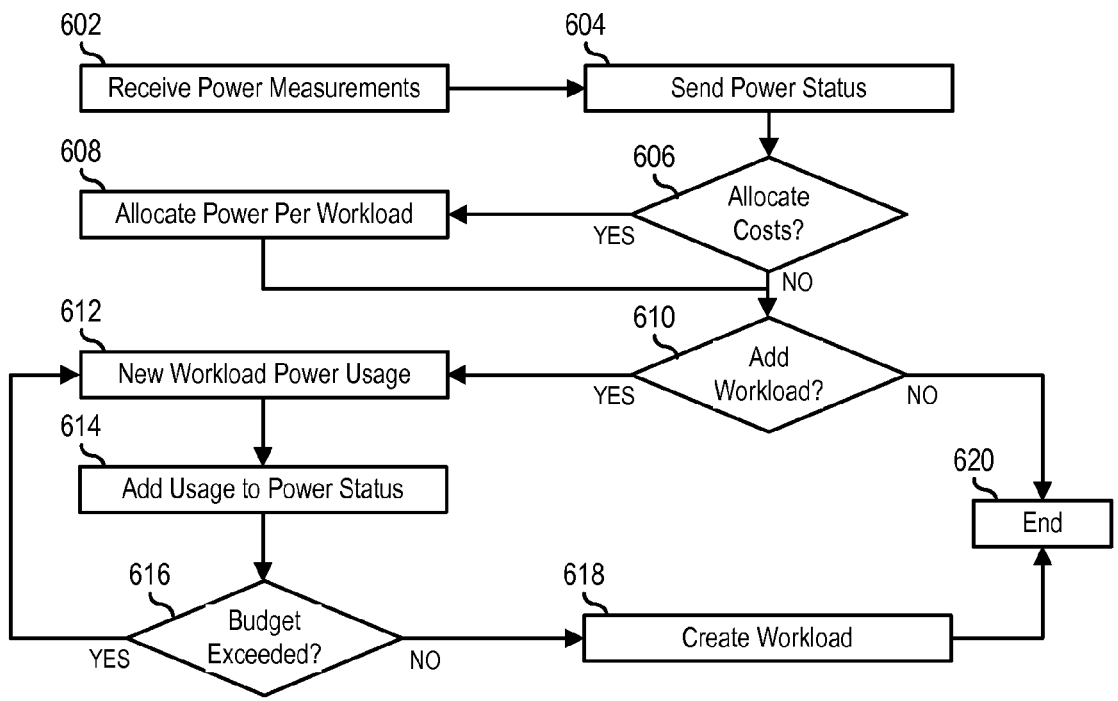
FIG. 6 is a flowchart illustrating a method to enable power related decisions in a virtualization environment.

FIG. 6 illustrates a method to enable power related decisions in a virtualization environment in a flowchart form, in accordance with an embodiment of the present disclosure. The method starts at block 602 where power measurements are received. For example, power status module 150 can receive power measurements for power supply 110, CPUs 120, I/O system 130, and memory system 140 from power detectors 115, 125, 135, and 145, respectively. A power status is sent in block 604. Thus power status module 150 can send the received power measurements to virtual machine manager 160. In addition, power status module 150 can determine a power level for the miscellaneous elements of virtualization environment 100 by subtracting the sum of the power levels from power detectors 125, 135, and 145 from the power level from power detector 115. A decision is made as to whether or not the cost of processing is to be allocated in decision block 604. If so, the "YES" branch of decision block 604 is taken, the cost of processing is allocated per workload in block 608, and processing continues in decision block 610 as described below. For example, virtual machine manager 160 can utilize workload resource information 220 to determine the workload power usages 232 and 234, and allocate the cost of processing for the various workloads.

After the cost of processing is allocated per workload in block 608, or if the cost of processing is not to be allocated and the "NO" branch of decision block 606 is taken, then a decision is made as to whether or not a workload is to be added in decision block 610. If not, then processing ends in block 620. If a workload is to be added, then the "YES" branch of decision block 610 is taken, and a new workload power usage is determined in block 612. For example, virtual machine manager 160 can consider WL-3 power usage 400 for creation in virtualization environment 100. The workload power usage is added to the power status in block 614. Thus virtual machine manager 160 can create WL-3 power allocation 405 by adding WL-3 power usage 400 to power allocation 300. A decision is made as whether or not the power allocation exceeds the power budget in decision block 616. If so, the "YES" branch of decision block 616 is taken and processing returns to block 612 where another new workload power usage is determined. For example, virtual machine manager 160 can consider WL-4 power usage 500 for creation in virtualization environment 100. If the power allocation does not exceed the power budget, then the "NO" branch of decision block 616 is taken and the workload is created in the virtualization environment in block 618, and processing ends in block 620. For example, the third workload can be created by virtual machine manager 160 in virtualization environment 100. In a particular embodiment (not illustrated), the method can proceed to consider additional workloads for creation in the virtualization environment by continuing processing in block 610.

Figure 7:
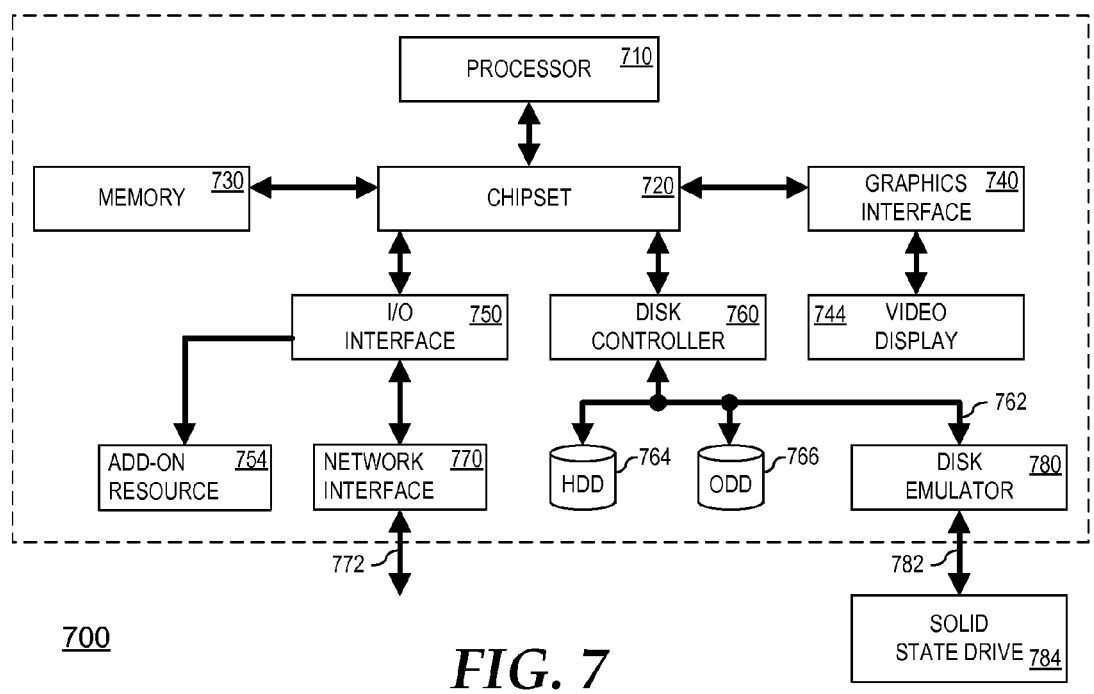
FIG. 7 is a functional block diagram illustrating an exemplary embodiment of an information handling system.

In a particular embodiment, an information handling system can be used to function as one or more of the network systems, or carry out one or more of the methods described above. In another embodiment, one or more of the systems described above can be implemented in the form of an information handling system. FIG. 7 illustrates a functional block diagram of an embodiment of an information handling system, generally designated as 700. Information handling system 700 includes processor 710, a chipset 720, a memory 730, a graphics interface 740, an input/output (I/O) interface 750, a disk controller 760, a network interface 770, and a disk emulator 780.

Processor 710 is coupled to chipset 720. Chipset 720 supports processor 710, allowing processor 710 to process machine-executable code. In a particular embodiment (not illustrated), information handling system 700 includes one or more additional processors, and chipset 720 supports the multiple processors, allowing for simultaneous processing by each of the processors, permitting the exchange of information between the processors and the other elements of information handling system 700. Processor 710 can be coupled to chipset 720 via a unique channel, or via a bus that shares information between processor 710, chipset 720, and other elements of information handling system 700.

Memory 730 is coupled to chipset 720. Memory 730 can be coupled to chipset 720 via a unique channel, or via a bus that shares information between chipset 720, memory 730, and other elements of information handling system 700. In particular, a bus can share information between processor 710, chipset 720 and memory 730. In a particular embodiment (not illustrated), processor 710 is coupled to memory 730 through a unique channel. In accordance with another aspect (not illustrated), an information handling system can include a separate memory dedicated to each of the processors. A non-limiting example of memory 730 includes static, dynamic. Or non-volatile random access memory (SRAM, DRAM, or NVRAM), read only memory (ROM), flash memory, another type of memory, or any combination thereof.

Graphics interface 740 is coupled to chipset 720. Graphics interface 740 can be coupled to chipset 720 via a unique channel, or via a bus that shares information between chipset 720, graphics interface 740, and other elements of information handling system 700. Graphics interface 740 is coupled to a video display 744. Other graphics interfaces (not illustrated) can also be used in addition to graphics interface 740 if needed or desired. Video display 744 can include one or more types of video displays, such as a flat panel display or other type of display device.

I/O interface 750 is coupled to chipset 720. I/O interface 750 can be coupled to chipset 720 via a unique channel, or via a bus that shares information between chipset 720, I/O interface 750, and other elements of information handling system 700. Other I/O interfaces (not illustrated) can also be used in addition to I/O interface 750 if needed or desired. I/O interface 750 is coupled to one or more add-on resources 754. Add-on resource 754 can also include another data storage system, a graphics interface, a network interface card (NIC), a sound/video processing card, another suitable add-on resource or any combination thereof.

Network interface device 770 is coupled to I/O interface 750. Network interface 770 can be coupled to I/O interface 750 via a unique channel, or via a bus that shares information between I/O interface 750, network interface 770, and other elements of information handling system 700. Other network interfaces (not illustrated) can also be used in addition to network interface 770 if needed or desired. Network interface 770 can be a network interface card (NIC) disposed within information handling system 700, on a main circuit board (e.g., a baseboard, a motherboard, or any combination thereof), integrated onto another component such as chipset 720, in another suitable location, or any combination thereof. Network interface 770 includes a network channel 772 that provide interfaces between information handling system 700 and other devices (not illustrated) that are external to information handling system 700. Network interface 770 can also include additional network channels (not illustrated).

Disk controller 760 is coupled to chipset 710. Disk controller 760 can be coupled to chipset 720 via a unique channel, or via a bus that shares information between chipset 720, disk controller 760, and other elements of information handling system 700. Other disk controllers (not illustrated) can also be used in addition to disk controller 760 if needed or desired. Disk controller 760 can include a disk interface 762. Disk controller 760 can be coupled to one or more disk drives via disk interface 762. Such disk drives include a hard disk drive (HDD) 764 or an optical disk drive (ODD) 766 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 760 can be coupled to disk emulator 780. Disk emulator 780 can permit a solid-state drive 784 to be coupled to information handling system 700 via an external interface. The external interface can include industry standard busses (e.g., USB or IEEE 1384 (Firewire)) or proprietary busses, or any combination thereof. Alternatively, solid-state drive 784 can be disposed within information handling system 700.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A virtualization system comprising:
a first power detector that detects a first power level of the virtualization system;
a second power detector that detects a second power level of the virtualization system;
a power status module; and
a virtual machine manager operable to start first and second workloads on the virtualization system;
wherein the power status module:
receives the first power level and the second power level; and
sends the first power level and the second power level to the virtual machine manager; and
wherein the virtual machine manager:
apportions a first portion of the first power level to the first workload;
apportions a second portion of the first power level to the second workload;
apportions a first portion of the second power level to the first workload; and
apportions a second portion of the second power level to the second workload.

2. The virtualization system of claim 1, wherein further the virtual machine manager determines a first total power level for the first workload, the first total power level being a sum of the first portion of the first power level and the first portion of the second power level.

3. The virtualization system of claim 2, wherein further the virtual machine manager:
 determines a second total power level for the second workload, the second total power level being a sum of the second portion of the first power level and the second portion of the second power level; and
 apportions a first processing cost to the first workload and a second processing cost to the second workload, the ratio of the first processing cost to the second processing cost being equal to the ratio of the first total power level to the second total power level.

4. The virtualization system of claim 1, wherein further:
 the first power level is associated with a first element of the virtualization system and the second power level is associated with a second element of the virtualization system;
 the virtual machine manager includes:
  a first power budget for the first element;
  a second budget for the second element;
  a first power allocation for a third workload, the first power allocation being associated with the first element; and
  a second power allocation for the third workload, the second power allocation being associated with the second element; and
 the virtual machine manager is operable to start the third workload on the virtualization system in response to determining that
  the sum of the first power level and the first power allocation is not greater than the first power budget; and
  the sum of the second power level and the second power allocation is not greater than the second power budget.

5. The virtualization system of claim 1, wherein further the power status module determines a third power level, the third power level being a difference of the first power level and the second power level.

6. The virtualization system of claim 5, wherein further:
 the power status module sends the third power level to the virtual machine manager; and
 the virtual machine manager:
  apportions a first portion of the third power level to the first workload; and
  apportions a second portion of the third power level to the second workload.

7. The virtualization system of claim 1, wherein the power status module comprises an application programming interface.

8. A method comprising:
 receiving at a power status module a first power level of an information handling system;
 receiving a second power level of the information handling system;
 sending the first power level and the second power level to a virtual machine manager of a virtualization environment;
 apportioning in the virtual machine manager:
  a first portion of the first power level to a first workload of the information handling system;
  a second portion of the first power level to a second workload of the information handling system;
  a first portion of the second power level to the first workload; and
  a second portion of the second power level to the second workload.

9. The method of claim 8, further comprising determining in the virtual machine manager a first total power level for the first workload, the first total power level being a sum of the first portion of the first power level and the first portion of the second power level.

10. The method of claim 9, further comprising:
 determining in the virtual machine manager a second total power level for the second workload, the second total power level being a sum of the second portion of the first power level and the second portion of the second power level; and
 apportioning in the virtual machine manager a first processing cost to the first workload and a second processing cost to the second workload, the ratio of the first processing cost to the second processing cost being equal to the ratio of the first total power level to the second total power level.

11. The method of claim 8, wherein:
 the first power level is associated with a first element of the information handling system and the second power level is associated with a second element of the information handling system;
 the virtual machine manager includes:
  a first power budget for the first element;
  a second budget for the second element;
  a first power allocation for a third workload, the first power allocation being associated with the first element; and
  a second power allocation for the third workload, the second power allocation being associated with the second element; and
 the method further comprises:
  determining in the virtual machine manager that:
   the sum of the first power level and the first power allocation is not greater than the first power budget; and
   the sum of the second power level and the second power allocation is not greater than the second power budget; and
  in response to determining, starting the third workload on the information handling system.

12. The method of claim 8, further comprising determining in the power status module a third power level, the third power level being a difference of the first power level and the second power level.

13. The method of claim 12, further comprising:
 sending the third power level to the virtual machine manager; and
 apportioning in the virtual machine manager a first portion of the third power level to the first workload; and
 apportioning in the virtual machine manager a second portion of the third power level to the second workload.

14. The method of claim 8, wherein the power status module comprises an application programming interface.

15. Machine-executable code for an information handling system comprising a first resource, wherein the machine-executable code is embedded within a non-transitory medium and includes instructions for carrying out a method comprising:
 receiving a first power level of the information handling system;
 receiving a second power level of the information handling system; and apportioning:
  a first portion of the first power level to a first workload of the information handling system;
  a second portion of the first power level to a second workload of the information handling system;
  a first portion of the second power level to the first workload; and
  a second portion of the second power level to the second workload.

16. The machine-executable code of claim 15, the method further comprising determining a first total power level for the first workload, the first total power level being a sum of the first portion of the first power level and the first portion of the second power level.

17. The machine-executable code of claim 16, the method further comprising:
  determining a second total power level for the second workload, the second total power level being a sum of the second portion of the first power level and the second portion of the second power level; and
  apportioning a first processing cost to the first workload and a second processing cost to the second workload, the ratio of the first processing cost to the second processing cost being equal to the ratio of the first total power level to the second total power level.

18. The machine-executable code of claim 15, wherein:
  the first power level is associated with a first element of the information handling system and the second power level is associated with a second element of the information handling system;
  the virtual machine manager includes:
    a first power budget for the first element;
    a second budget for the second element;
    a first power allocation for a third workload, the first power allocation being associated with the first element; and
    a second power allocation for the third workload, the second power allocation being associated with the second element; and
  the method further comprises:
    determining that:
      the sum of the first power level and a first power allocation for a third workload is not greater than a first power budget for the first element, wherein the first power allocation is associated with the first element; and
      the sum of the second power level and a second power allocation for the third workload is not greater than the second power budget, wherein the second power allocation is associated with the second element; and
    in response to determining, starting the third workload on the information handling system.

19. The machine-executable code of claim 15, the method further comprising determining a third power level, the third power level being a difference of the first power level and the second power level.

20. The machine-executable code of claim 19, the method further comprising apportioning:
  a first portion of the third power level to the first workload; and
  a second portion of the third power level to the second workload.

* * * * *